April 26, 1938. E. A. CORBIN, JR 2,115,008
TENDON PULLER
Filed Dec. 21, 1936
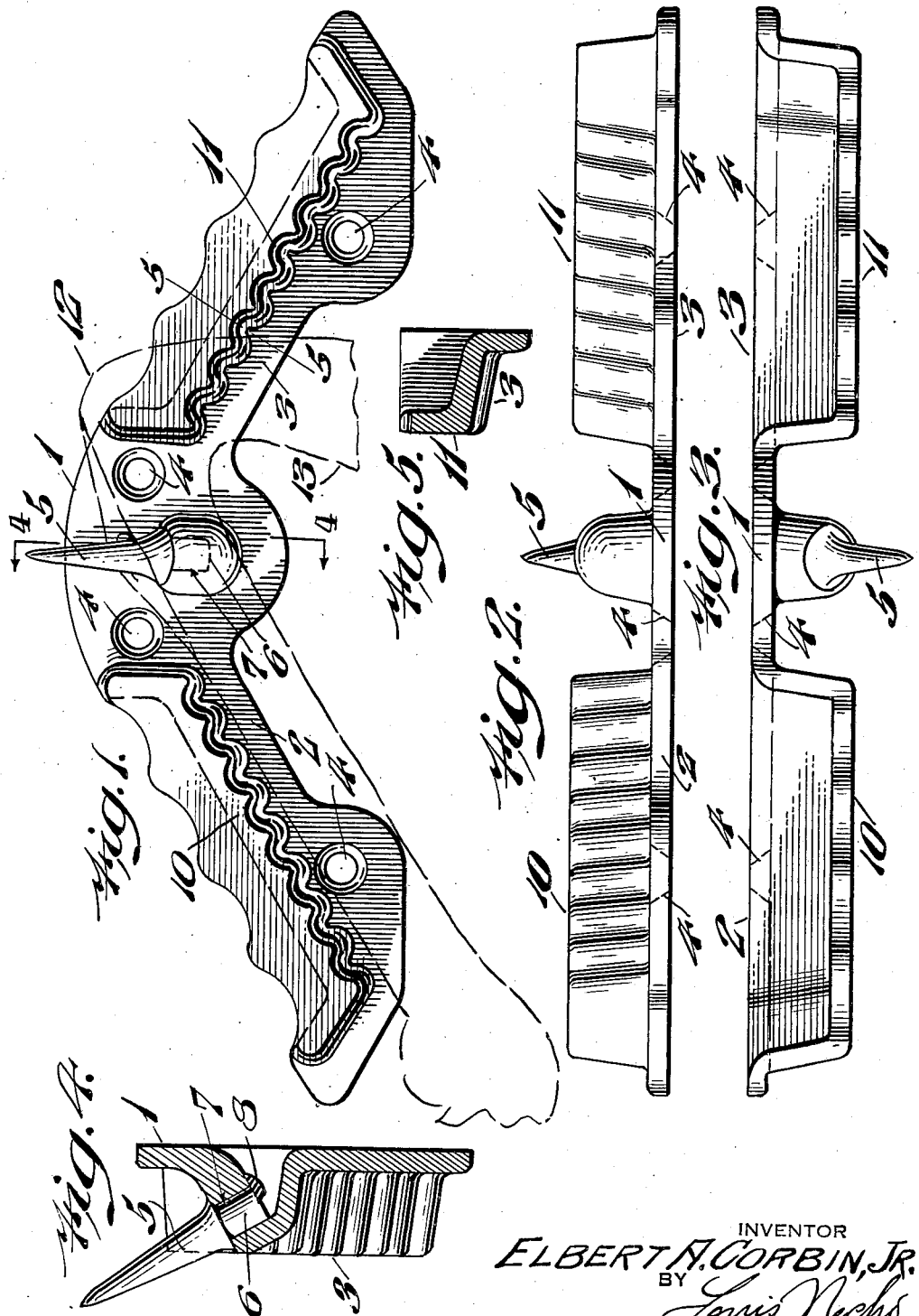
INVENTOR
*Elbert A. Corbin, Jr.*
BY
*Louis Nechs*
ATTORNEY Patented Apr. 26, 1938

2,115,008

UNITED STATES PATENT OFFICE 2,115,008

TENDON PULLER

Elbert A. Corbin, Jr., Morton, Pa., assignor of one-half to William C. Biddle, Lansdowne, Pa.

Application December 21, 1936, Serial No. 116,979

1 Claim. (Cl. 17—11.3)

My invention relates to a new and useful tendon puller of the type adapted to be used in meat markets and poultry shops as well as in private homes.

It is well known that in the legs of fowls such as turkeys, chickens, and the like, there are several very tough tendons interspaced among the muscle meat and which, if not removed before the fowl is cooked, are very difficult to remove with the ordinary fork and knife used at the dinner table.

It is now the practice of attendants in meat markets, when dressing a fowl purchased by a customer, to remove the tendons, and to this end various devices more or less bulky and complicated have been made and are in use. Some of the devices now in use are not only bulky, expensive to produce, or complicated, but some of them also break the leg of the chicken during the extraction of the tendons, which is not desirable. The bulky tendon pullers now in use are not adapted for use in kitchens in the home where space is limited, and are not very practical even in meat markets where space is even more scarce.

It is therefore the object of my invention to produce a tendon puller which is of an extremely simple and compact construction and which can be secured to any available support and in a very small space.

It is a further object of my invention to produce a tendon puller which does not include any moving parts and hence is not subject to breakage or wear or tear, and one which is extremely efficient and easy to operate without any experience or great skill.

In the accompanying drawing:

Fig. 1 is a view in front elevation of a tendon puller embodying my invention.

Fig. 2 represents a bottom plan view of Fig. 1.

Fig. 3 represents a top plan view of Fig. 1.

Fig. 4 represents a section on line 4—4 of Fig. 1.

Fig. 5 represents a section on line 5—5 of Fig. 1.

Referring to the drawing in which like reference characters indicate like parts, my novel tendon puller is formed of a central body portion 1 and two lateral portions or wings 2 and 3, said body portion and said wings being provided with any number of holes 4 through which fastening means such as screws, bolts, nails, or the like, may be driven into the wall or other suitable support. 5 designates a spike or prong which is provided with the stem 6 in the seat 7 and which is spot-welded as at 8 or otherwise suitably secured in position. On the wings 2 and 3 are provided the pocketed undulated or corrugated members 10 and 11 which serve as hand grips in the operation of the device.

As shown in dotted lines in Fig. 1, the chicken leg is placed, in the case of a right handed operator, against the left wing 2 (with the claws extended to the left of Fig. 1) and the spike 5 is made to pierce the leg immediately below the knee point 12 so as to engage the tendons. In this position the thigh 13 of the fowl will extend downwardly. The operator then grasps the leg and the corrugated grip 10 with the left hand, and with the right hand exerts a pull downwardly on the thigh 13. The tendons being secured fast to the bone of the leg, and being subjected to the pulling pressure, tend to separate at their junctions with the muscles and the thigh portion 13. If the operator is left handed, the position of the parts is reversed, with the leg of the chicken placed against the wing 3 and the thigh 13 assuming a position to the left of the spike 5 as viewed in Fig. 1 so that the operator can exert a downward pull on the thigh 13 with the left hand instead of with the right hand.

It will be noted that the spike 5 is mounted at an angle to a hub or boss which projects forwardly from and beyond the vertical plane of the body portion 1 as best seen in Figs. 3 and 4. This greatly facilitates insertion of the spike through the leg of the fowl for engagement with the tendons to be pulled.

It will thus be seen that in my tendon puller there are no moving parts and that it is extremely simple in construction and operation, since it is merely necessary to cast the body portion in its entirety in one piece and then to insert and secure in position the spike 5.

Having thus described my invention, what I claim as new and desire to secure by Letters Patent is:

A tendon puller comprising a bracket adapted to be secured to a support and comprising a central body portion and oppositely extending wings, a spike projecting forwardly and upwardly from said body portion, and hand grips formed on said wings.

ELBERT A. CORBIN, Jr.